United States Patent [19]

Zamuner

[11] Patent Number: 5,079,404
[45] Date of Patent: Jan. 7, 1992

[54] WELDING TORCH WITH FUME-EXTRACTION HOOD

[76] Inventor: Frank Zamuner, 1110 Dundas St. West, Oakville, Ontario, Canada, L6J 4Z2

[21] Appl. No.: 602,762

[22] Filed: Oct. 24, 1990

[51] Int. Cl.⁵ .............................................. B23K 9/32
[52] U.S. Cl. .............................................. 219/137.41
[58] Field of Search .......................... 219/137.41, 136

[56] References Cited

U.S. PATENT DOCUMENTS 3,775,587 11/1973 Lindkvist ............................ 219/136
4,617,033 10/1986 Strang ............................ 219/137.41

FOREIGN PATENT DOCUMENTS 2035173 6/1980 United Kingdom ........... 219/137.41

Primary Examiner—Clifford C. Shaw
Attorney, Agent, or Firm—Anthony Asquith & Co.

[57] ABSTRACT

The torch is of the kind which includes a hollow handle, attached to a goose-neck. Smoke, etc. is drawn through the hollow body of the torch, i.e. the gooseneck and handle, and into a vacuum hose attached to the handle. A fume extraction duct is attached to the body, and the duct is in several movable parts which can articulate. The cumbersome vacuum hose is attached not to the fume extraction duct, but to the body. O-rings are provided at the various joints and connections in the duct, to provide friction. The friction is such that the articulation movements are light enough that the welder can manipulate the duct with his hands, without tools, and without breaking the arc, and yet the duct is stiff enough to hold itself in the as-set position, after the welder releases the duct.

7 Claims, 3 Drawing Sheets

WELDING TORCH WITH FUME-EXTRACTION HOOD

This invention relates to welding torches of the kind that are connected to a vacuum source for the purpose of extracting the smoke and fumes that emanate from a welding arc.

BACKGROUND TO THE INVENTION

As is well-known, the atmosphere can be very smoky in workshops in which welding is performed. Apart from the smells, eye-irritant, and general unpleasantness, the smoke and fumes carry traces of carcinogens and other hazards to a welding operator's health.

Two approaches to the problem have been addressed: (a) by allowing fumes from all the torches to enter the shop atmosphere and then installing an air cleaning system for the whole workshop, or (b) by adding a hood to the torch itself, at source, near the arc, to draw in the fumes before they can escape into the workshop.

The latter approach is theoretically the more attractive, since it is generally more economical to remove contaminants where they are concentrated rather than after they have been allowed to dissipate. However, hitherto, the problem of extracting the fumes actually at source, i.e. with a hood that fits on the torch, has not been fully solved.

Those prior torches which have had good fume extraction have had hoods which interfered with the welder's ability to see the weld and its surroundings. But if the hood was positioned so that visibility was not impaired, the fume extraction performance of the hood was very poor.

One of the difficulties also is that if the hood is located too close to the arc, and/or if the fume extraction is too strong, not only the fumes but the carbon dioxide or other gas supplied to the arc may be drawn away, thus permitting oxidation to take place, and making the weld porous.

THE PRIOR ART

A known design of torch is shown in U.S. Pat. No. 3,775,587 (LINDKVIST, 27-Nov.-73). The torch is coupled to a vacuum hose, and a vacuum source is connected to the remote end of the hose. In this design, a fume hood is provided, which can be manipulated by the welder over the arc area.

However, in the LINDKVIST design, some of the movements and manipulations of the fume hood are only possible if the vacuum hose is itself manipulated. The vacuum hose is an unwieldy, cumbersome component: if, in order to place the fume hood over the arc, he has to hold the vacuum hose in an unnaturally twisted or bent position, the welding operator quickly tires of exerting the forces required to do so.

It is customary for the welder in fact to hold the welding torch with both hands during operation; nevertheless, if the welder is required, in order to maintain a particular position of the fume hood, to apply a twist to the vacuum hose with one hand, and to hold the torch in position with the other hand, he soon grows tired of doing so. So irritating is it to the welder to apply any extra force to twist or bend the vacuum hose relative to the torch, that he actually prefers to allow the smoke and fumes to pass unchecked around him.

The LINDKVIST design is an example of the kind of manipulatable fume hood which, in practice, is virtually never used. The welder does not tend to use such an awkward fume hood on his own initiative. If his supervisor stands over him, of course the welder can be made to set the fume hood over the arc, and to maintain the hood in the correct position. Experience shows, however, that as soon as the welder is left to his own devices, he simply ignores the fume hood.

Another manipulatable fume hood is shown in U.S. Pat. No. 4,656,329 (MOERKE, 7-Apr.-87). U.S. Pat. No. 4,287,405 (OHMAE+, 1-Sept.-81) shows a fume hood which travels along rails and follows the line of the weld. U.S. Pat. No. 3,921,223 (HOYECKI, 25-Nov.-75) shows a device which hangs around the welder's neck and prevents the fumes from entering his face mask.

Many types of welding torch include means for supplying CO2 or other gas to the arc. The gas supply pipes in some torches have been manipulatable, so that the welder may apply the gas most effectively to the arc. The gas supply pipe is much smaller, and more manageable, than a vacuum hose, but nevertheless it is found that the welder finds it most tiresome to have to adjust and hold the gas pipe in position.

Examples of manipulatable gas pipes are shown in U.S. Pat. No. 3,286,073 (KOFRON, 15-Nov.-66) and U.S. Pat. No. 3,940,586 (STEARNS+, 24-Feb.-76).

Also, devices have been proposed for improving the view-ability of the welding process, which have involved the use of periscopes, or the like. Examples of manipulatable periscopes are shown in U.S. Pat. No. 3,209,121 (MANZ, 4-Sept.-62) and U.S. Pat. No. 4,599,506 (BURKE+, 8-July-86).

GENERAL FEATURES OF THE INVENTION

The invention is aimed at providing a fume hood which is so easy to manipulate that the welder will, on his own initiative, actually use it in practice. The invention provides an articulatable fume duct, including a fume hood, which is not attached to the vacuum hose, but rather the vacuum hose is attached to the torch handle, i.e. to the body of the torch. The articulatable fume duct is also attached to the body of the torch. A passage is provided inside the body of the torch between the fume duct and the vacuum hose.

Thus, in the invention, the fume duct can be manipulated to a new position without the welder having to bend and drag and twist the hose.

In the invention, the fume duct can be articulated and manipulated relative to the body of the torch as a self-contained item. Movements of the fume duct are not dependent on, nor accompanied by, movements of other components of the welding torch system.

In the invention, the fume duct is articulatable to such an extent that the duct can be manipulatd by the welder with one hand, while he is holding the torch in his other hand. It is even possible that the welder can make some of the adjustments to the duct with the same hand that is holding the torch.

In the invention, a means is provided for retaining the duct in the position in which it has been set by the welder. It would not do for the fume duct to be so easy to articulate that the duct simply flopped down, under gravity. The motion-resisting means of the invention acts to hold the duct to whatever position it has been set. The resistance provided by the motion-resisting means should, in the invention, be high enough that the duct automatically stays in the set position when the welder lets go. On the other hand, the resistance should be low enough that the welder has little difficulty in manipulating the duct with his (gloved) fingers and hands: in the invention, it is essential that the resistance to the articulation movement of the duct should not be so high that the welder would have to use tools to effect the movement.

In the invention, neither the vacuum hose, nor any other unwieldy component, is hanging on to the duct. Therefore, in the invention, the designer not only can arrange that the duct is easy to set, but also he can arrange that the duct holds itself in the set position.

The fact that the duct of the invention is easy to set means that the setting will be lost if the torch should be dropped or knocked. If that happens, however, the welder simply resets the duct.

The duct of the invention is so easy to use that the welder actually uses it. The real test of the ease of use of a fume hood arises when welding along a path which includes many obstructions and awkward positions for the torch. Using a torch equipped with the fume duct of the invention, the welder can be observed to flip the fume hood aside as the torch approaches an obstacle, and to flip the hood back over the arc when the torch is once more in the clear.

One of the aspects of a good torch is that the torch should interfere as little as possible with the ability of the welder to view the weld. Thus, the torch should be slim and of a narow clean outline, especially in the lower area of the torch, near the arc area, and should have no protuberances from the profile of the torch. In the invention, although the welder of course has the option of positioning the duct so that the duct completely obstructs his view, he also has the just-as-easy option of setting the duct so as to give the best compromise between visibility and smoke extraction. Furthermore, the duct is so easy to re-position that the welder can re-position the duct as he proceeds along the line of the weld, and he can do so without breaking the arc.

Another aspect of good torch design is that the torch should be light in weight. The duct of course has its own weight, but apart from that, in the invention, very little extra structure has to be incorporated into the torch as a result of having to accommodate the duct. In the invention, the rest of the torch is almost as it would be if the torch were not provided with a duct at all.

DETAILED DESCRIPTION OF PREFERRED EMBODIMENT

By way of further explanation of the invention, an exemplary embodiment of the invention will now be described with reference to the accompanying drawings, in which.

The apparatus shown in the accompanying drawings and described below are examples which embody the invention. It should be noted that the scope of the invention is defined by the accompanying claims, and not necessarily by specific features of exemplary embodiments.

Figure 1:
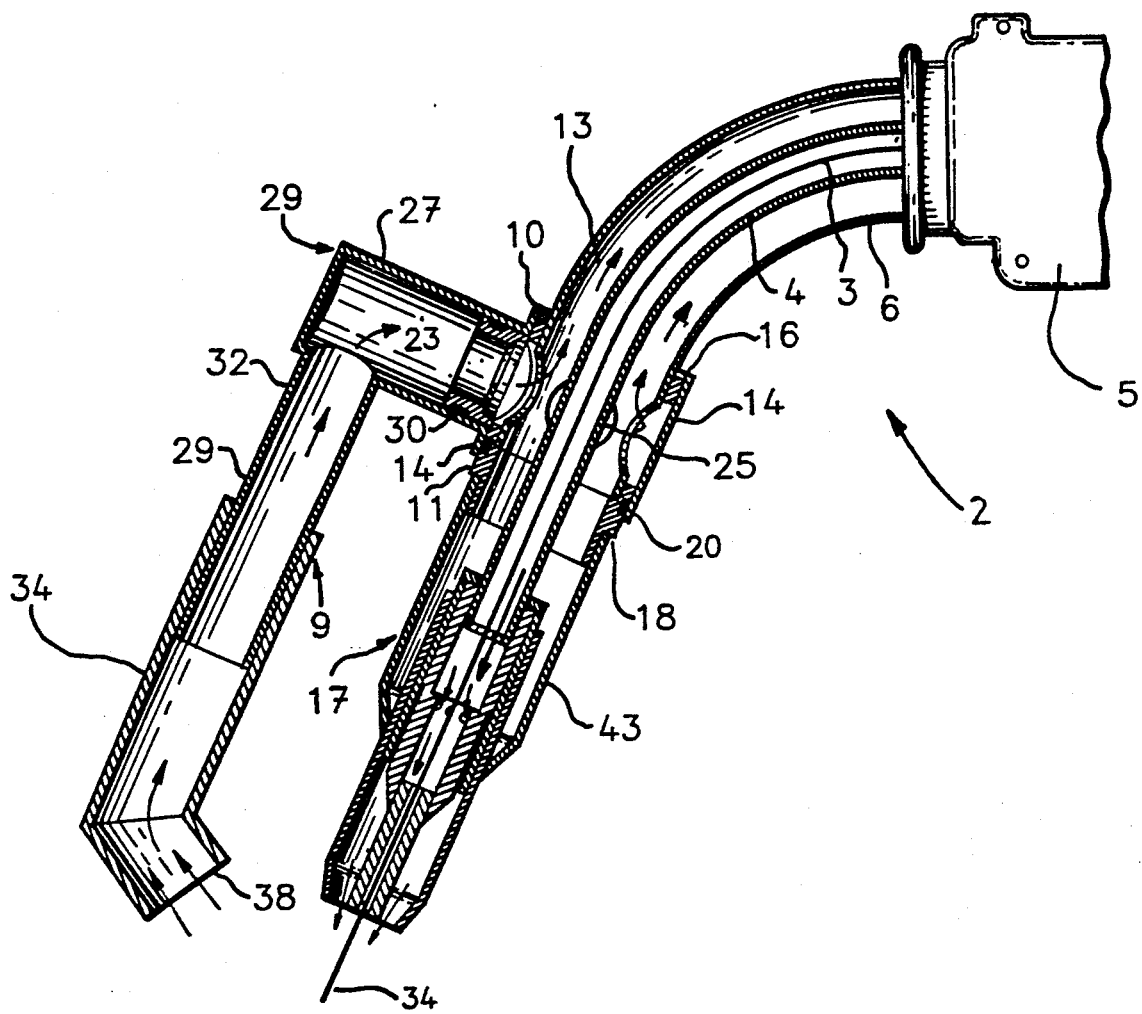
FIG. 1 is a cross-section of a welding torch which embodies the present invention.

The torch 2 shown in FIG. 1 includes a consumable wire electrode 3, which is fed down the central axis of the torch, and which terminates in an arc tip 3A. Surrounding the electrode 3 is a pipe 4, through which is fed an arc-protecting gas, such as carbon dioxide. A feed means for the wire 3 and a supply means for the gas are provided by the torch's service station (not shown).

Figure 3:
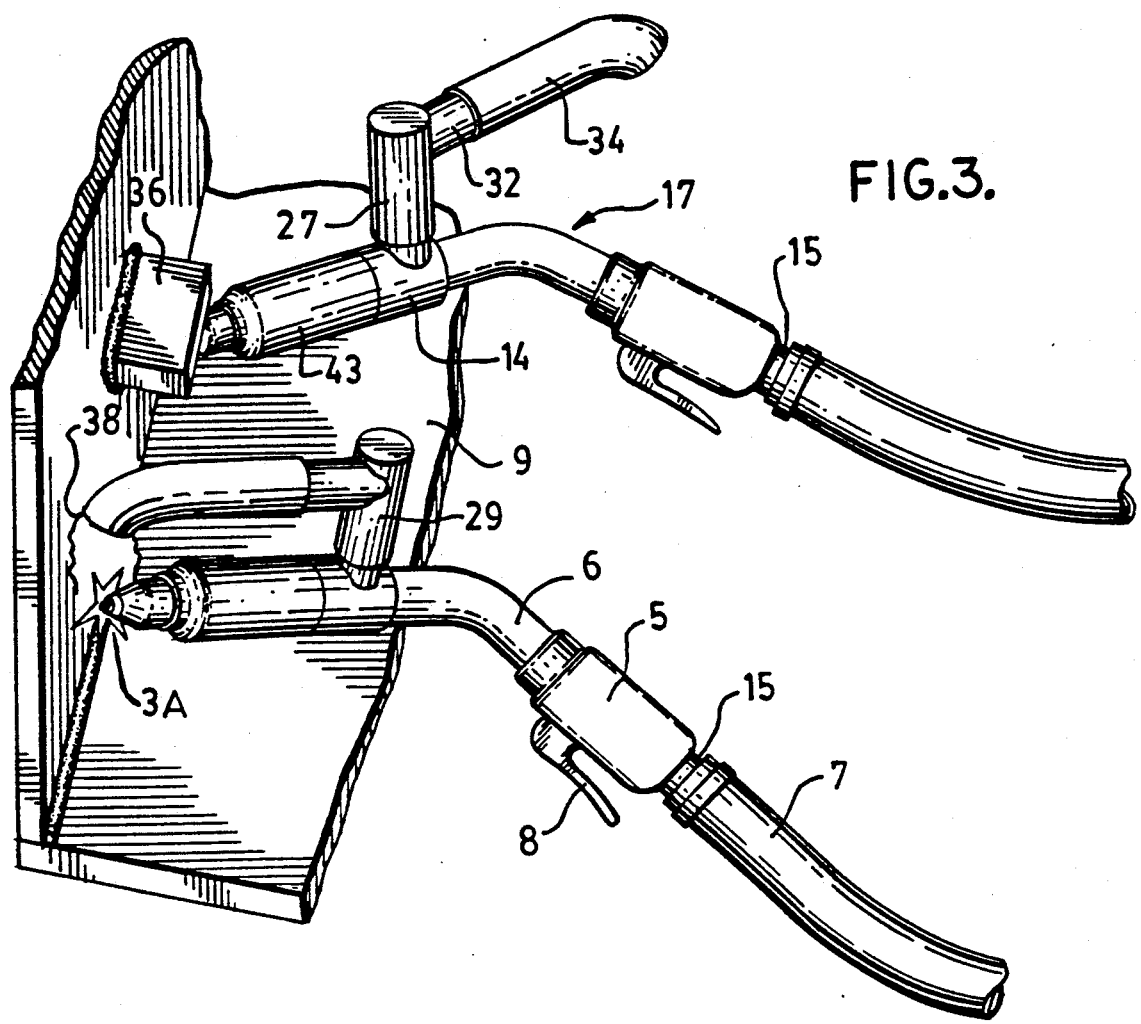
FIG. 3 is a view of the torch of FIG. 1, showing two modes of adjustment, as will occur during operation.

The torch 2 includes a handle 5 and a goose-neck tube 6. A vacuum source is provided at the service station, by means of which air is drawn through the goose-neck, through the handle 5, and through a vacuum hose 7 (FIG. 3). The handle 5 is generally cylindrical, and hollow, and defines a passage 13. The passage 13 connects with a cylindrical spigot 15 attached to the handle 5, to which the vacuum hose is clamped.

A trigger 8 is provided, by which the welder may switch on/off the wire feed means, the current for the arc, the gas source, and the vacuum source.

As described thus far, the torch is conventional. In accordance with the invention, the torch includes a fume extraction duct 9, which is articulatable relative to the body 17 of the torch. The gas-pipe 4, the handle 5, the goose-neck 6, and the hose spigot 15, are all unitary with and integral with the body 17 during operation of the torch (though the components can be separated for servicing etc purposes).

An upper collar 10 and lower collar 12 are slipped over the goose-neck 6, and are permanently fixed thereto (e.g. by brazing) in a spaced apart relationship, as shown. A sleeve 14 is assembled over the collars, and abuts a flange 16 on the upper collar 10. Once assembled, a circlip 18 retains the sleeve on and between the collars. The inside diameter of the sleeve 14 is a loose enough fit on the collars to permit the sleeve to rotate freely upon the collars. O-rings 20 add some frictional resistance to the rotation of the sleeve 14.

The sleeve 14 includes a stub-tube 23. The stub-tube 23 is secured into, and sealed into, the sleeve 14 (e.g. by brazing) in such a manner that fumes and smoke present in the stub-tube may pass straight through to the interior of the sleeve. The lower portion of the goose-neck tube 6 is provided with holes 25, whereby fumes and gases in the interior of the sleeve may in turn be drawn into the goose-neck, and out through the hose 7.

One arm 27 of an elbow 29 fits over the stub-tube 23. The fit of the arm 27 is such that the elbow 29 may freely rotate on the stub-type, but an O-ring 30 adds some frictional resistance to the rotation of the elbow. Also, the elbow 29 is simply slipped over the stub-tube: the elbow is retained in position on the stub-tube by the friction of the O-ring 30.

The other arm 32 of the elbow 29 fits into a fume hood 34. The fit of the fume hood on the arm 32 is loose enough to permit relative rotation and axial sliding of the hood 34.

The O-rings 20 and 30 provided extra friction for their respective fits, but extra friction will usually not be needed in respect of the fit of the arm 32 to the hood 34. Thin tubes, as in the arm 32 and hood 34, are generally inevitably slightly distorted out-of-round, at least to a sufficient extent to cause the required slight frictional resistance.

Figure 2:
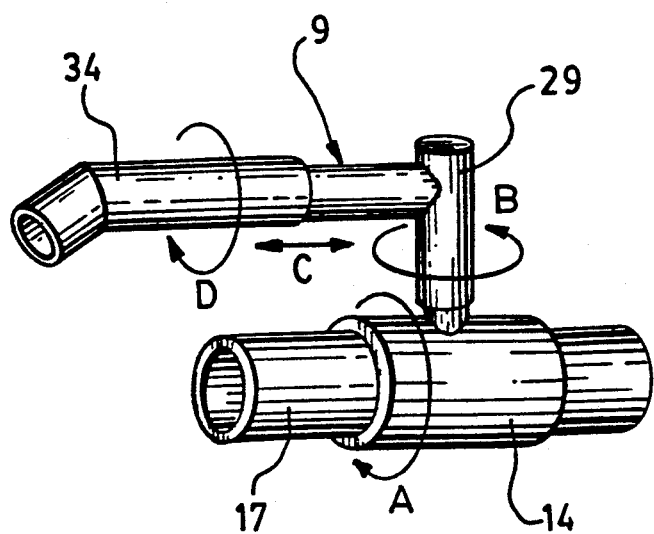
FIG. 2 is a diagrammatic view showing some of the modes of adjustment of the torch of FIG. 1.

FIG. 2 shows diagrammatically the modes of adjustment through which the fume duct 9 may be manipulated. Mode A permits the hood to rotate through a full circle around the axis of the lower portion of the torch. Thus, whatever the angle at which the welder finds it most convenient to hold the torch, he can always position the fume hood vertically over the arc tip.

Mode B also permits the hood to swivel through a full circle. Thus, if there should be an obstruction whereby the hood cannot be accommodated over the nozzle, the welder may swivel the hood out of the way to any suitable position in which the hood is clear of the obstruction.

FIG. 3 illustrates an example of this. The torch 2 when in position I in the lower portion of the drawing has its duct 9 positioned correctly for maximum extraction of smoke and fumes from the arc tip 3A. The torch may proceed along the line of the weld, as shown, with the hood in this position, until the obstruction 36 is encountered. Now, the welder swivels the duct out of the way while he manipulates the torch under the obstruction, as shown in position II of the torch.

Once the torch is clear of the obstruction 38, it is a very easy matter for the welder to flip the hood back again.

As mentioned, the O-rings 20, in addition to providing a vacuum seal, provide also a frictional resistance to the rotation of the sleeve 14 around the goose-neck tube 6. In fact, it is not essential that the seals 20 be provided from the sealing standpoint: the major purpose of the seals is to provide the friction. Without the seals, the fume duct 9 would simply flop down: with the O-rings, the sleeve is gripped sufficiently tightly as to retain itself in whatever position it is set. On the other hand, the grip from the O-ring is not too tight: the welding operator may easily manipulate the duct by rotating the sleeve around the gooseneck. It would be contrary to the aims of the invention if the welder had to pick up and adjustment tool every time he wished to re-set the position of the hood.

The modes of movement C and D (FIG. 2) allow fine adjustments to be made. For example, if the duct should be swivelled slightly about the axis B to acommodate a particular orientation of the torch, the hood 34 would probably have to be rotated slightly about the axis D to bring the mouth 36 of the hood once more directly over the arc. The mode C of movement is required if the torch has to tipped excessively.

The articulatable duct of the invention, as mentioned, is so easy to use that it tends to be used. The duct is very easy to swivel out of the way of obstructions in confined spaces. It may be noted that when the torch is in a confined space it is then often comparatively easy to extract the fumes and smoke, so that even though the mouth 38 of the hood may then be some inches away from the arc tip, the hood may still be effective to collect smoke. It is when the torch is in an open area that the fumes are most difficult to collect and contain.

As the torch moves from a confined space back out into the open therefore, it generally happens that the welding operator notices a sudden increase in the quantity of fumes and smoke, and this alerts him to perform the simple task of flipping the hood back into position over the arc. The result is that, even over a long shift, and even when welding many different kinds of job, from clear, open welds to welds which follow intricate paths around obstructions, the welder tends to be constantly using the hood, and constantly manipulating the hood into the best position where it extracts the most fumes.

The stub-tube 23 should not be set too close to the lower end of the torch, ie to the arc area. The reason for this is that the hood 34 should not extend into the arm 27 of the elbow 29, even when the hood is at the top of its possible movement under the mode C (FIG. 2). In the LINDKVIST design, for example, the "hood" was allowed to encroach into the "elbow". As a result, the passageways through LINDKVIST's elbow had to be twice as large: first, to accommodate the gas flow in the passageway; and second to accommodate the hood. The stub-tube 23 should therefore be set well up the body of the troch, to allow the hood 34 a range of movement in mode C without the hood encroaching into the elbow 29.

Figure 4:
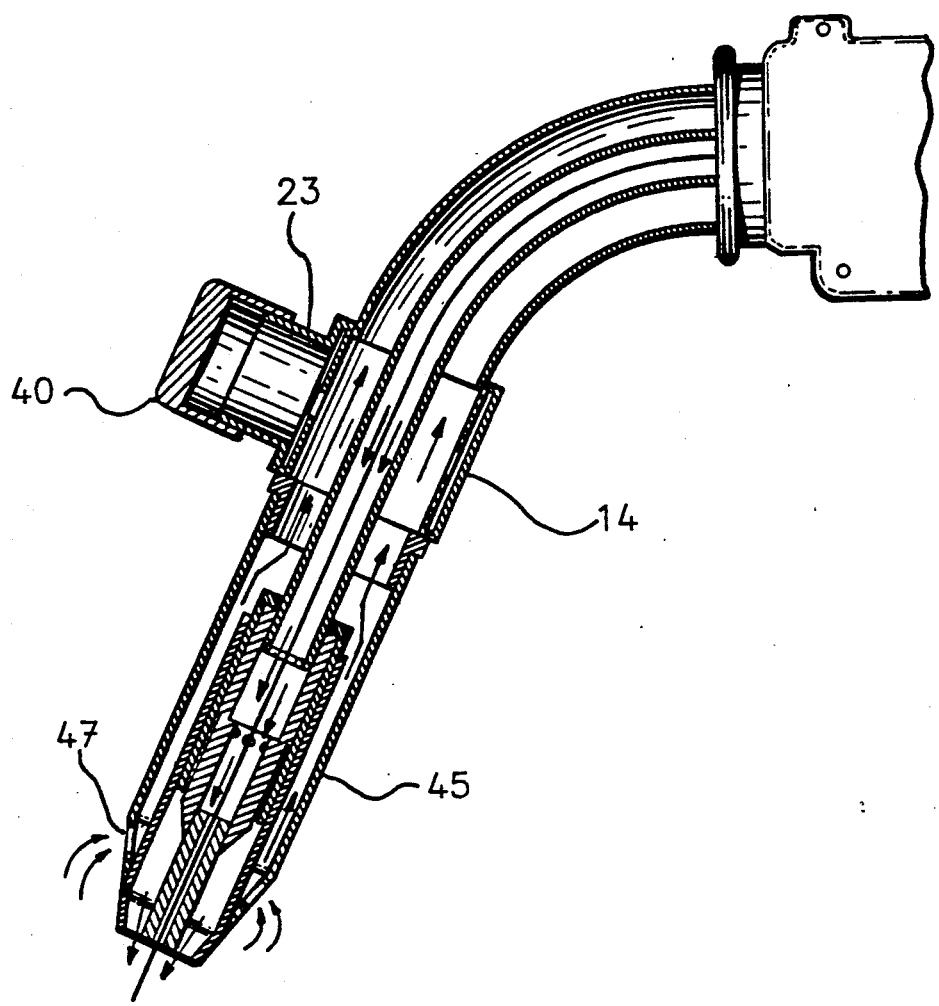
FIG. 4 is a view of the torch of FIG. 1, shown in a partially modified form.

As shown in FIG. 4, the duct may be dismantled by removing the elbow and hood. A cap 40 is in this case slipped over the stub-tube 23 to close off the vacuum passage. When the fume duct is removed in this way the fumes are not drawn into the vacuum hose, and can escape into the atmosphere. It is then advantageous to replace the plain cover 43 (FIG. 1) with a perforated cover 45, the space inside the cover 45 being in communication with the vacuum spigot and hose 7.

The perforations 47 act to draw in smoke and fumes, but without interfering with the gas flow to the arc. As mentioned, the reason for removing the duct 9 would generally be that obstructions and confined spaces are present; a mentioned, smoke extraction from a confined space is much easier, and the perforations 47 may be all that is required.

In fact, the hood 34 and elbow 29 may be left in place and used in conjunction with the perforated cover 45. This results in more effective collection of smoke and fumes in some circumstances.

The duct of the invention is thus so versatile and easy to use that, when it would be advantageous to remove the duct, the duct can easily be so removed. Also, the covers 43, 45 may be on a bayonet attachment, so that they too can be simply removed and exchanged by hand.

The manner in which the duct, as described, is permitted to move is such that the mouth 38 of the hood cannot approach too closely to the arc. Although a good range of movement is permitted, the movement is not universal, the purpose of the limitation being to ensure that the welder cannot inadvertently place the mouth of the hood so close to the arc that the CO2 might be sucked away from the arc.

The mouth 38 of the hood is about 4 sq cm in area, and at the closest position of the mouth to the arc the extremity of the hood which defines the mouth comes no closer than about 2 cm from the hood.

I claim:
1. Welding torch, wherein:
   the torch includes a wire electrode, which terminates in an arc tip;
   the torch includes a rigid body, having a handle portion;
   the body includes a vacuum hose connection spigot, which is suitable for connecting the body to, and for separating the body from, a flexible vacuum hose;
   the structure of the body is such that the vacuum hose connection spigot is, at least during use of the torch, integral and unitary with, and immovable relative to, the body;
   the torch includes a fume extraction duct;
   the torch includes a vacuum passage means, formed in the rigid body of the torch, for providing a vacuum-tight and vacuum-transmitting connection through the body of the torch, between the fume extraction duct and the vacuum hose connection spigot;

the fume extraction duct includes a fume hood, which has a mouth;

the mouth of the fume hood is of such dimensions that, when the mouth is positioned over the arc tip, the mouth is capable of receiving substantially all the smoke and fumes created at the arc tip;

the torch includes a means for attaching the fume extraction duct to the rigid body of the torch, and includes an articulation means, for the articulation of the duct relative to the body;

the said articulation means is so arranged as to permit such a range of articulation of the fume extraction duct relative to the rigid body that the said mouth may be removed, substantially completely, from the arc tip;

the torch includes a motion-resisting means, for providing a resistance to the motion permitted by the articulation means;

the motion-resisting means is effective to provide resistance of such low magnitude that the welding operator, in order to set the position of the duct relative to the body, can, while holding the handle portion of the body in his hands, readily articulate the duct with his hands and without the use of tools, and of such high magnitude that, once set, the duct automatically remains in the set position when the operator has removed his hands from the duct.

2. Torch of claim 1, wherein the torch includes a gas supply pipe, which is so arranged as to direct gas supplied in the tube to the arc tip.

3. Torch of claim 2, wherein:

the body includes, in addition to the handle portion, a lower portion, each portion having a respective axis;

the body includes also a goose-neck shaped tube, which interconnects the handle portion and the lower portion;

the arrangement of the body is such that the axis of the handle portion lies at a substantial angle to the axis of the lower portion;

the structure of the body is such that the handle portion, the lower portion, the goose-neck shaped tube, and the gas supply pipe are all, at least during use of the torch, integral and unitary with, and immovable relative to, the body.

4. Torch of claim 3, wherein:

the vacuum hose connection spigot is cylindrical in form, having an axis which is coaxial with the axis of the handle portion; and the handle portion is generally cylindrical in form, and hollow, and the said vacuum passage means includes the hollow handle portion.

5. Welding torch, wherein:

the torch includes a wire electrode, which terminates in an arc tip;

the torch includes a rigid body, having a handle portion;

the body includes a vacuum hose connection spigot, which is suitable for connecting the body to, and for separating the body from, a flexible vacuum hose;

the structure of the body is such that the vacuum hose connection spigot is, at least during use of the torch, integral and unitary with, and immovable relative to, the body;

the torch includes a fume extraction duct;

the torch includes a vacuum passage means, formed in the rigid body of the torch, for providing a vacuum-tight and vacuum-transmitting connection through the body of the torch, between the fume extraction duct and the vacuum hose connection spigot;

the fume extraction duct includes a fume hood, which has a mouth;

the mouth of the fume hood is of such dimensions that, when the mouth is positioned over the arc tip, the mouth is capable of receiving substantially all the smoke and fumes created at the arc tip;

the torch includes a means for attaching the fume extraction duct to the rigid body of the torch, and includes an articulation means, for the articulation of the duct relative to the body;

the said articulation means is so arranged as to permit such a range of articulation of the fume extraction duct relative to the rigid body that the said mouth may be removed, substantially completely, from the arc tip;

the torch includes a motion-resisting means, for providing a resistance to the motion permitted by the articulation means;

the motion-resisting means is effective to provide resistance of such low magnitude that the welding operator, in order to set the position of the duct relative to the body, can, while holding the handle portion of the body in his hands, readily articulated the duct with his hands and without the use of tools, and of such high magnitude that, once set, the duct automatically remains in the set position when the operator has removed his hands from the duct;

the torch includes a gas supply pipe, which is so arranged as to direct gas supplied in the tube to the arc tip;

the body includes, in addition to the handle portion, a lower portion, each portion having a respective axis;

the body includes also a goose-neck shaped tube, which interconnects the handle portion and the lower portion;

the arrangement of the body is such that the axis of the handle portion lies at a substantial angle to the axis of the lower portion;

the structure of the body is such that the handle portion, the lower portion, the goose-neck shaped tube, and the gas supply pipe are all, at least during use of the torch, integral and unitary with, and immovable relative to, the body;

the articulation means includes a rotation means, for permitting the fume extraction duct to rotate around the body about an axis of rotation which is coaxial with the axis of the lower portion of the body;

the articulation means includes a swivel means, for permitting the fume extraction duct to swivel about an axis of swivelling which radial with respect to the axis of the lower portion of the body;

and the said swivel means is so arranged as to permit such a range of swivelling of the fume extraction duct that the mouth of the duct may be removed, substantially completely, from the arc tip.

6. Torch of claim 5, wherein the duct comprises a plurality of separate tubes, which are connected together, and the rotation means and the swivel means comprise connections between the said tubes.

7. Torch of claim 6, wherein, at one of the connection between the tubes, an O-ring seal is provided, which is effective to mutually seal the tubes at the connection, and the O-ring seal provides sufficient friction between the tubes as to comprise the motion-resistance means.

* * * * *